US 12,525,169 B2

(12) United States Patent
Kato et al.

(10) Patent No.: US 12,525,169 B2
(45) Date of Patent: Jan. 13, 2026

(54) COMPUTER

(71) Applicant: Wacom Co., Ltd., Saitama (JP)

(72) Inventors: Tatsunori Kato, Saitama (JP); Yoshihiro Kotani, Saitama (JP); Hiroyuki Sakuma, Saitama (JP); Joo Hoon Lee, Saitama (JP); Hiroshi Mizuhashi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/657,431

(22) Filed: May 7, 2024

(65) Prior Publication Data

US 2024/0296779 A1 Sep. 5, 2024

Related U.S. Application Data

(63) Continuation of application No. 18/193,459, filed on Mar. 30, 2023, now Pat. No. 12,002,409.

(30) Foreign Application Priority Data

May 9, 2022 (JP) ................................ 2022-076942

(51) Int. Cl.
*G09G 3/20* (2006.01)
*G06F 3/0354* (2013.01)
(Continued)

(52) U.S. Cl.
CPC ....... *G09G 3/2096* (2013.01); *G06F 3/03545* (2013.01); *G06F 3/04162* (2019.05);
(Continued)

(58) Field of Classification Search
None
See application file for complete search history.

(56) References Cited

U.S. PATENT DOCUMENTS

| 9,721,365 B2 | 8/2017 | Worfolk |
| 2008/0225036 A1 | 9/2008 | Song et al. |

(Continued)

FOREIGN PATENT DOCUMENTS

| JP | 2008233869 A | 10/2008 |
| JP | 2013137368 A | 7/2013 |
| JP | 2015207287 A | 11/2015 |

OTHER PUBLICATIONS

Extended European Search Report, dated Sep. 13, 2023, for the corresponding European Patent Application No. 23167306.2. (7 pages).

*Primary Examiner* — Nicholas J Lee
(74) *Attorney, Agent, or Firm* — Seed Intellectual Property Law Group LLP (57) ABSTRACT

Provided is a computer including a host processor which, in operation, generates a stroke image representing a stroke indicated by a series of coordinate data indicating a plurality of positions of a pen on a touch surface and generates a video signal representing the stroke image, a timing controller which, in operation, controls, based on the video signal, a potential of each of a plurality of gate lines provided in a display, and a temporary stroke image generation processor which in operation, generates, in parallel with the host processor, a temporary stroke image representing a same stroke as the stroke of the stroke image, in which the temporary stroke image is superimposed on the video signal before the video signal is supplied to the timing controller.

8 Claims, 7 Drawing Sheets

(51) Int. Cl.
   *G06F 3/041*     (2006.01)
   *G06T 11/20*     (2006.01)
   *H04N 5/265*     (2006.01)

(52) U.S. Cl.
   CPC ........... *G06T 11/203* (2013.01); *H04N 5/265* (2013.01); *G09G 2320/0666* (2013.01); *G09G 2340/0435* (2013.01); *G09G 2340/10* (2013.01); *G09G 2340/125* (2013.01); *G09G 2354/00* (2013.01)

(56)             References Cited

U.S. PATENT DOCUMENTS

| | | |
|---|---|---|
| 2013/0169671 A1 | 7/2013 | Iwahara et al. |
| 2014/0313144 A1* | 10/2014 | Seto ..................... G06F 3/0416 345/173 |
| 2015/0235391 A1 | 8/2015 | Makino et al. |
| 2015/0301678 A1 | 10/2015 | Park et al. |

\* cited by examiner

COMPUTER

BACKGROUND

Technical Field

The present disclosure relates to a computer, and particularly, to a computer that can prevent a delay in displaying a stroke image.

Description of the Related Art

In a computer, such as a tablet terminal, corresponding to pen input, data (hereinafter, collectively referred to as "pen data"), such as coordinate data indicating the position of a pen and a pen pressure value transmitted by the pen, is supplied from a sensor controller connected to a touch sensor to a host processor. The host processor executes a process of generating a stroke image representing a stroke on the basis of the supplied pen data and displaying the generated stroke image on a display.

An example of the computer corresponding to pen input is disclosed in U.S. Pat. No. 9,721,365 (hereinafter, Patent Document 1). To prevent a delay in displaying a stroke image caused by a processing delay in the computer, the computer described in Patent Document 1 includes an overlay engine provided in a timing controller that is a component of a display. The coordinate data is directly transmitted from a sensor controller to the overlay engine. The overlay engine executes a process of generating a temporary stroke image on the basis of the coordinate data received from the sensor controller and using the generated temporary stroke image to update a display frame received from a host processor.

An example of a liquid crystal display apparatus including, on a front stage of a timing controller, a graphic processing circuit including a scaler is disclosed in Japanese Patent Laid-open No. 2008-233869.

Although the technique described in Patent Document 1 can prevent a delay in displaying the stroke image, there is a problem that the overlay engine needs to be provided in the timing controller that is a component of the display. Therefore, a technique that can prevent a delay in displaying the stroke image without providing the overlay engine in the timing controller is needed.

Thus, an object of the present disclosure is to provide a computer that can prevent a delay in displaying a stroke image without providing an overlay engine in a timing controller.

BRIEF SUMMARY DISCLOSURE

The present disclosure provides a computer including: a host processor which, in operation, generates a stroke image representing a stroke indicated by a series of coordinate data indicating a plurality of positions of a pen on a touch surface and generates a video signal representing the stroke image, a timing controller which, in operation, controls, based on the video signal, a potential of each of a plurality of gate lines provided in a display, and a temporary stroke image generation processor which, in operation, generates, in parallel with the host processor, a temporary stroke image representing a same stroke as the stroke represented by the stroke image, in which the temporary stroke image is superimposed on the video signal before the video signal is supplied to the timing controller.

According to the present disclosure, the temporary stroke image representing the same stroke as the stroke represented by the stroke image generated by the host processor is generated in parallel with the host processor, and the temporary stroke image is superimposed on the video signal before the video signal is supplied to the timing controller. This can prevent a delay in displaying the stroke image without providing the overlay engine in the timing controller.

DETAILED DESCRIPTION

Embodiments of the present disclosure will now be described in detail with reference to the attached drawings.

Figure 1:
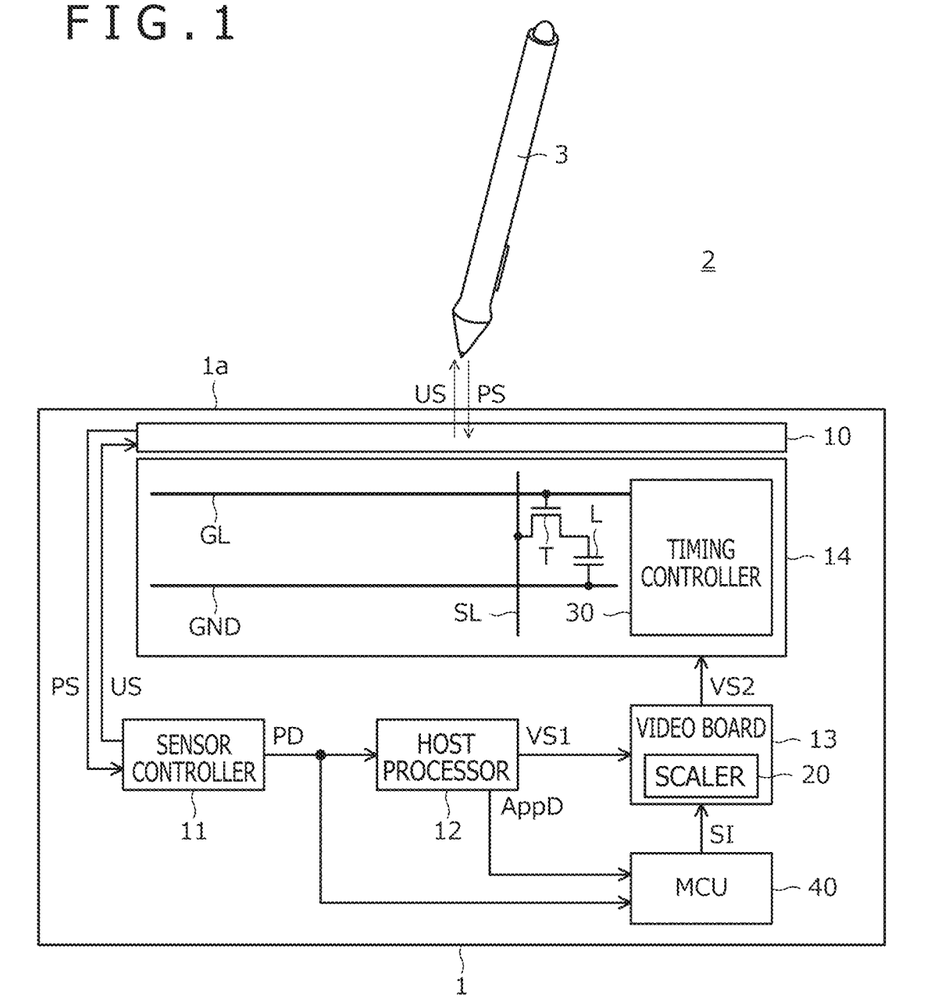
FIG. 1 depicts a configuration of a position detection system including a computer according to a first embodiment of the present disclosure.

FIG. 1 depicts a configuration of a position detection system 2 including a computer 1 according to a first embodiment of the present disclosure. As illustrated in FIG. 1, the position detection system 2 includes an electronic pen 3 in addition to the computer 1.

The computer 1 is a computer, such as a tablet terminal and a smartphone, including a panel surface 1a used as both a touch surface and a display surface. Here, the computer 1 may be a computer in which one of a touch panel and a digitizer corresponding to pen input and a display for displaying an image are separately provided.

The computer 1 and the electronic pen 3 can use an electromagnetic resonance system (EMR system) to perform two-way communication. A signal transmitted from the computer 1 to the electronic pen 3 through the communication will be referred to as an "uplink signal US," and a signal transmitted from the electronic pen 3 to the computer 1 will be referred to as a "pen signal PS." Note that the computer 1 and the electronic pen 3 may use another system, such as an active capacitive system, to communicate.

The computer 1 includes a sensor 10, a sensor controller 11, a host processor 12, a video board 13, a display panel 14, and an MCU (Micro Controller Unit) 40.

The sensor 10 includes a plurality of loop coils arranged inside the panel surface 1a. One end of each loop coil is connected to the sensor controller 11, and the other end is grounded. Each loop coil is coupled by electromagnetic induction to a coil in an LC resonant circuit provided inside the electronic pen 3. In this way, each loop coil plays a role of supplying operating power and a command to the electronic pen 3 and receiving the pen signal PS transmitted by the electronic pen 3.

The sensor controller 11 is an integrated circuit that transmits the uplink signal US to the electronic pen 3 through the sensor 10 and that receives the pen signal PS transmitted by the electronic pen 3 as a reflection signal of the uplink signal US. The uplink signal US is a signal for supplying operating power and a command to the electronic pen 3, and the uplink signal US is periodically transmitted from the sensor controller 11. While the uplink signal US is received, the electronic pen 3 stores the power in a capacitor of the LC resonant circuit. Once the reception of the uplink signal US is finished, the electronic pen 3 uses the stored power to transmit the pen signal PS.

Every time the sensor controller 11 transmits the uplink signal US, the sensor controller 11 executes a process of deriving coordinate data indicating the position of the electronic pen 3 in the panel surface 1a on the basis of the received pen signal PS. Specifically, the sensor controller 11 is configured to derive the distribution of the reception strength of the pen signal PS in the panel surface 1a on the basis of the reception strength of the pen signal PS in each loop coil. The sensor controller 11 is configured to derive the coordinate data of the position corresponding to the peak of the distribution to derive the coordinate data indicating the position of the electronic pen 3.

The sensor controller 11 also executes a process of detecting a phase change of the received pen signal PS to acquire a value (hereinafter, referred to as "pen pressure value") indicating the pressure applied to the pen tip of the electronic pen 3. More specifically, the capacitor included in the LC resonant circuit of the electronic pen 3 includes a variable capacitor in which the capacitance is changed by the pressure applied to the pen tip of the electronic pen 3. When the capacitance of the variable capacitor changes, the resonant frequency of the LC resonant circuit changes. Therefore, the frequency of the pen signal PS also changes. The sensor controller 11 detects the phase change of the pen signal PS to detect the change in the frequency and acquires the pen pressure value on the basis of the result of the detection.

The sensor controller 11 is configured to sequentially supply the derived coordinate data and the acquired pen pressure value to the host processor 12 and the MCU 40. The data supplied from the sensor controller 11 to the host processor 12 and the MCU 40 will be collectively referred to as "pen data PD" in some cases.

The host processor 12 is a central processing unit of the computer 1. The host processor 12 is configured to read programs from a storage apparatus not illustrated and execute the programs to execute various applications including an operating system of the computer 1 and a drawing application corresponding to pen input. The processes executed by the host processor 12 include a process of generating a video signal VS1 representing a desktop image of the computer 1 and supplying the video signal VS1 to the video board 13.

The drawing application is an application with a function of generating a stroke image representing a stroke indicated by the pen data PD supplied from the sensor controller 11 and arranging the generated stroke image in the desktop image. The stroke is a trajectory of the pen tip indicated by a series of coordinate data acquired while the pen pressure value is a value larger than 0 (that is, the pen tip of the electronic pen 3 is in contact with the panel surface 1a). The series of coordinate data of the stroke is smoothly connected to obtain an approximation curve, and the stroke image is a curve image obtained by providing the approximation curve with a line width corresponding to the pen pressure value. Examples of the approximation curve include a Bezier curve and a Catmull-Rom curve. When drawing data AppD, such as a brush size and a line color, is set in the drawing application, the drawing application is also configured to generate the stroke image according to the set drawing data AppD.

The video board 13 is an apparatus that converts the video signal VS1 supplied from the host processor 12 into a video signal VS2 that is a signal corresponding to the display panel 14. Specifically, the video board 13 includes a scaler 20 that is an integrated circuit configured to adjust the resolution, the frame rate, and the color to values that can be supplied to the display panel 14. The video board 13 is configured to supply, to the display panel 14, the video signal VS2 that is the video signal VS1 adjusted by the scaler 20.

The display panel 14 is an apparatus that displays, on the panel surface 1a, a video corresponding to the video signal VS2. The specific type of the display panel 14 is not particularly limited, and the display panel 14 may be, for example, a liquid crystal display or an organic EL (electroluminescent) display. It is assumed here that the display panel 14 is a liquid crystal display of TFT (Thin Film Transistor) type, and the display panel 14 includes a plurality of pixels, each including a thin film transistor T and a liquid crystal element L, a plurality of gate lines GL, a plurality of signal lines SL, and common ground wiring GND, as illustrated in FIG. 1. Note that FIG. 1 illustrates only one pixel, one gate line GL, one signal line SL, and the common ground wiring GND. The plurality of pixels are arranged in a matrix. Each gate line GL is connected in common to the gates of the plurality of thin film transistors T lined up in the row direction, and each gate line SL is connected in common to the sources of the plurality of thin film transistors T lined up in the column direction.

The display panel 14 executes a process of driving the pixels on a row-by-row basis. Specifically, the display panel 14 determines the potential to be provided to the liquid crystal element L of each pixel of a target row on the basis of the video signal VS2 and provides the determined potential to each signal line SL. The display panel 14 then sets the potential of the gate line GL of the target row to high. Consequently, the potential corresponding to the video signal VS2 is provided to each liquid crystal element L of the target row, and the video corresponding to the video signal VS2 is displayed for the target row.

The display panel 14 includes a timing controller 30. The timing controller 30 is a circuit that controls the potential of each of the plurality of gate lines GL on the basis of the video signal VS2, and the timing controller 30 plays a role of controlling the timing of supplying the potential.

The MCU 40 is a processing circuit (temporary stroke image generation processor) that generates, in parallel with the host processor 12, a temporary stroke image SI representing the same stroke as in the stroke image generated by the host processor 12 and that superimposes the temporary stroke image SI on the video signal VS2 before the video signal VS2 is supplied to the timing controller 30. The MCU 40 is configured to generate the temporary stroke image SI on the basis of the series of pen data PD supplied from the sensor controller 11.

The temporary stroke image SI here may be an image with completely the same appearance as the stroke image generated by the host processor 12 or may not be an image with completely the same appearance. In the former case, the MCU 40 receives the drawing data AppD from the host processor 12 and generates the temporary stroke image SI on the basis of the received drawing data AppD. In the latter case, the MCU 40 may or may not receive, from the host processor 12, all or part of the drawing data AppD set in the drawing application. When the MCU 40 receives all or part of the drawing data AppD from the host processor 12, the MCU 40 generates the temporary stroke image SI on the basis of the received drawing data AppD. When the MCU 40 does not receive the drawing data AppD from the host processor 12, the MCU 40 generates the temporary stroke image SI on the basis of predetermined setting.

The scaler 20 of the present embodiment plays a role of actually superimposing, on the video signal VS2, the temporary stroke image SI supplied from the MCU 40. This will be described in detail with reference to FIG. 2.

Figure 2:
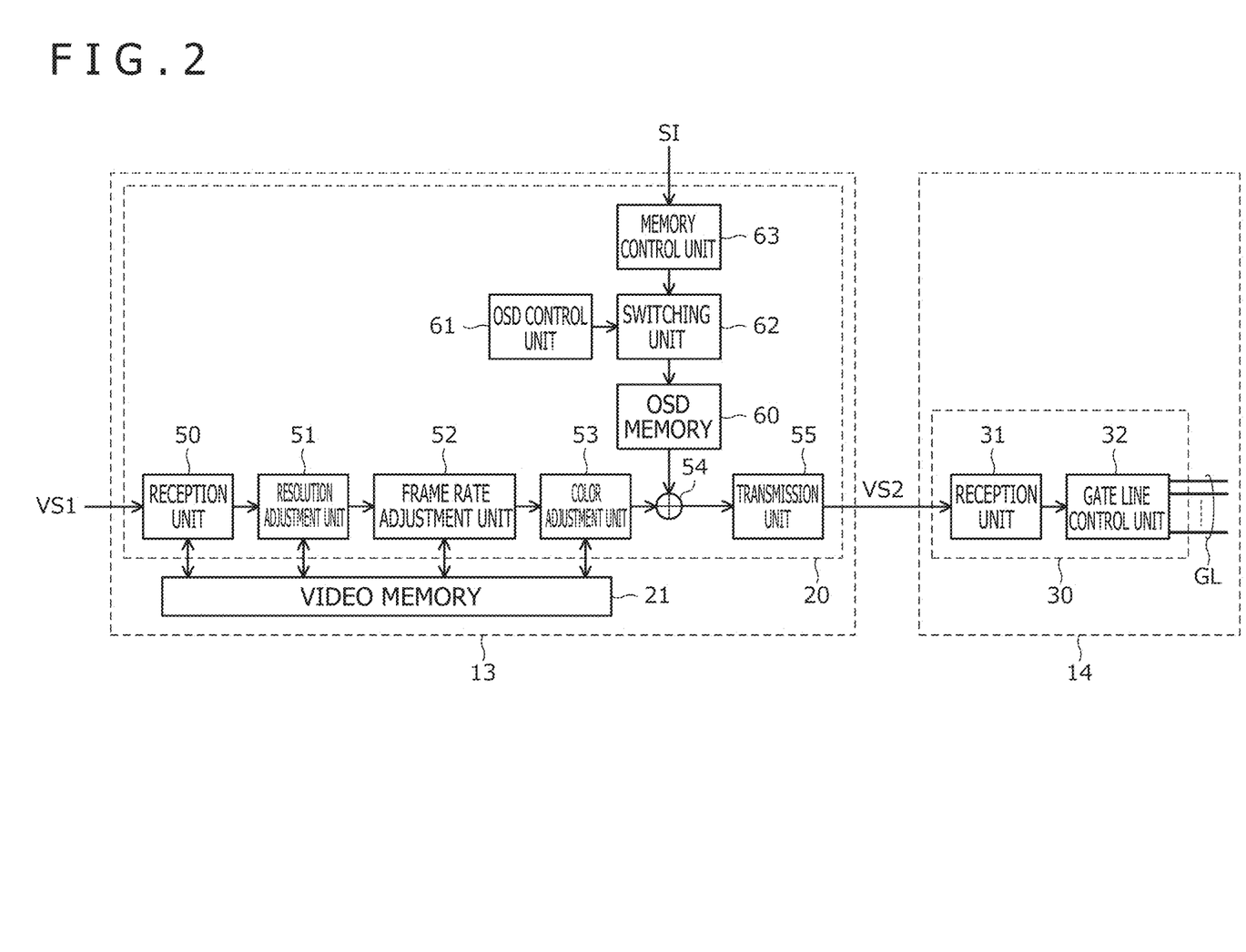
FIG. 2 depicts an internal configuration of a video board and a display panel according to the first embodiment of the present disclosure.

FIG. 2 depicts an internal configuration of the video board 13 and the display panel 14 according to the present embodiment. As illustrated in FIG. 2, the video board 13 includes a video memory 21 in addition to the scaler 20. The scaler 20 includes a reception unit 50, a resolution adjustment unit 51, a frame rate adjustment unit 52, a color adjustment unit 53, a mixer 54, a transmission unit 55, an OSD (On-Screen Display) memory 60, an OSD control unit 61, a switching unit 62, and a memory control unit 63. The timing controller 30 includes a reception unit 31 and a gate line control unit 32.

The reception unit 50 is a circuit that receives the video signal VS1 output by the host processor 12. The reception unit 50 writes the received video signal VS1 to the video memory 21. The video memory 21 is a storage unit that can store the video signal VS1 corresponding to at least one screen.

The resolution adjustment unit 51 is a circuit that adjusts the resolution of the video signal VS1 received by the reception unit 50 according to the resolution of the display panel 14. For example, when the resolution of the video signal VS1 is FHD (1920×1080), and the resolution of the display panel 14 is 4K (3840×2160), the resolution adjustment unit 51 executes a process of quadrupling the resolution of the video signal VS1. The resolution adjustment unit 51 is configured to read the video signal VS1 to be adjusted from the video memory 21 and overwrite the video memory 21 with the adjusted video signal VS1.

The frame rate adjustment unit 52 is a circuit that adjusts the frame rate of the video signal VS1 adjusted by the resolution adjustment unit 51 according to the frame rate of the display panel 14. For example, when the frame rate of the video signal VS1 is 60 FPS and the frame rate of the display panel 14 is 30 FPS, the frame rate adjustment unit 52 executes a process of halving the frame rate of the video signal VS1. The frame rate adjustment unit 52 is configured to read the video signal VS1 to be adjusted from the video memory 21 and overwrite the video memory 21 with the adjusted video signal VS1.

The color adjustment unit 53 is a circuit that adjusts the colors of the video signal VS1 adjusted by the frame rate adjustment unit 52 according to the color gamut of the display panel 14. For example, when the color gamut of the video signal VS1 is sRGB and the color gamut of the display panel 14 is NTSC (National Television System Committee), the color adjustment unit 53 executes a process of reconstructing the colors of the video signal VS1 on the basis of NTSC. The color adjustment unit 53 also has a function of detecting the type of video (such as natural images, baseball, and animation) and performing color correction corresponding to the detected type. The color adjustment unit 53 is configured to read the video signal VS1 to be adjusted from the video memory 21 and supply the adjusted video signal VS1 to the mixer 54.

The OSD memory 60 is a storage unit that stores an image (hereinafter, referred to as "OSD image") to be superimposed on the video expressed by the video signal VS1. The OSD control unit 61 is a circuit that generates an OSD image according to user operation and that writes the OSD image to the OSD memory 60. In a typical example, the OSD image is a screen that is displayed when the user presses a button provided on an edge of the display panel 14 and that is for adjusting the color and the position of the screen. The OSD memory 60 can store the image corresponding to at least one screen.

The mixer 54 is a circuit that superimposes the OSD image stored in the OSD memory 60 on the video signal VS1 supplied from the color adjustment unit 53. After the process by the mixer 54, the OSD image is displayed on the video (forefront of the video) expressed by the video signal VS1.

The transmission unit 55 is a circuit that supplies, to the display panel 14, the video signal VS2 that is the video signal VS1 processed by the mixer 54. Specifically, the transmission unit 55 is configured to input the video signal VS2 to a line buffer row-by-row and sequentially transmit, to the display panel 14, the pixels corresponding to one row stored in the line buffer. The transmission unit 55 is also configured to transmit a horizontal synchronization signal (HSYNC) at the end of a row and transmit a vertical synchronization signal (VSYNC) at the end of a screen. The horizontal synchronization signal (HSYNC) and the vertical synchronization signal (VSYNC) are also part of the video signal VS2. The reception unit 31 in the timing controller 30 is a circuit that receives the video signal VS2 supplied in this way and that supplies the video signal VS2 to the gate line control unit 32. The gate line control unit 32 is a circuit that controls the potential of each of the plurality of gate lines GL on the basis of the video signal VS2 supplied from the reception unit 31.

The memory control unit 63 is a circuit that writes, to the OSD memory 60, the temporary stroke image SI generated by the MCU 40. The switching unit 62 is provided between the memory control unit 63 as well as the OSD control unit 61 and the OSD memory 60. The switching unit 62 plays a role of connecting the memory control unit 63 to the OSD memory 60 when the memory control unit 63 writes the temporary stroke image SI to the OSD memory 60. The switching unit 62 plays a role of connecting the OSD control unit 61 to the OSD memory 60 when the memory control unit 63 does not write the temporary stroke image SI to the OSD memory 60. In this way, the temporary stroke image SI is displayed on the video expressed by the video signal VS1, in priority to the OSD image.

As described above, the computer 1 of the present embodiment generates, in parallel with the host processor 12, the temporary stroke image SI representing the same stoke as in the stroke image generated by the host processor 12 and superimposes the temporary stroke image SI on the video signal before the video signal is supplied to the timing controller 30. This can prevent a delay in displaying the stroke image caused by a processing delay in the computer 1 (such as late processing by the host processor 12) without providing the overlay engine in the timing controller 30.

In addition, the computer 1 of the present embodiment can use the existing mixer 54 and OSD memory 60 to superimpose the temporary stroke image SI on the video signal VS2.

This can reduce the circuit scale compared to the case in which the dedicated overlay engine and buffer are provided as in Patent Document 1.

Figure 3:
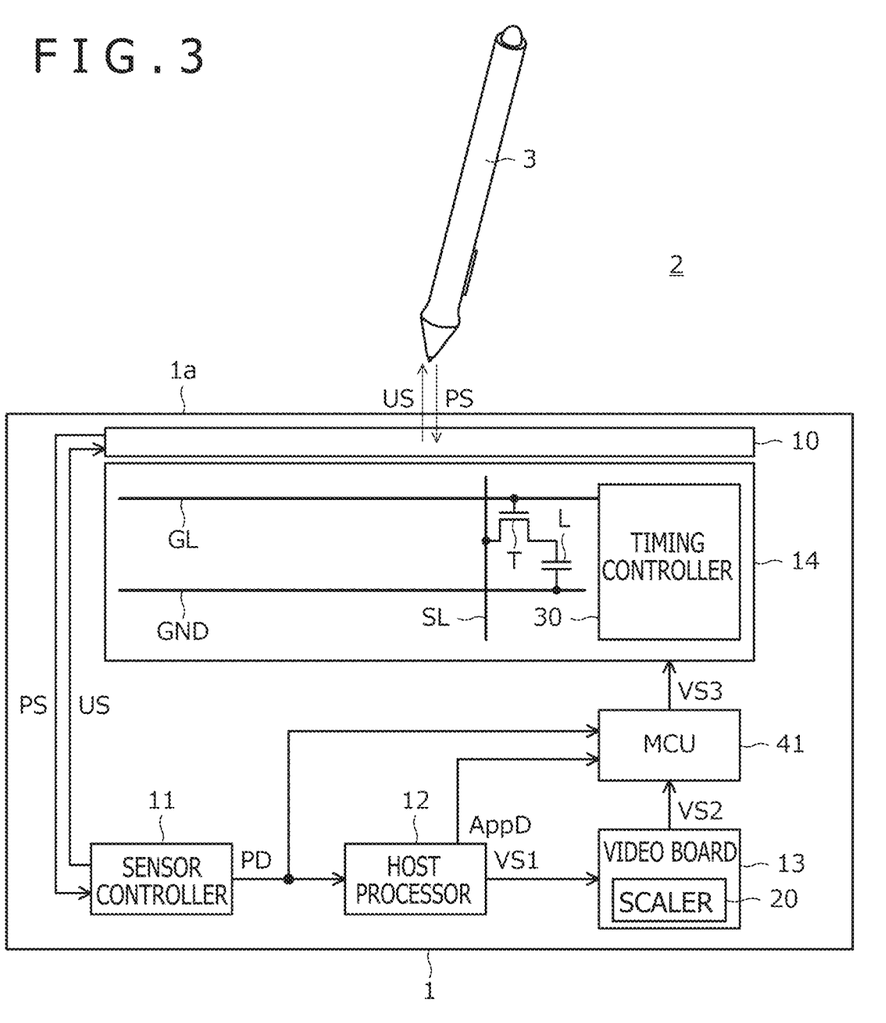
FIG. 3 depicts a configuration of the position detection system including the computer according to a second embodiment of the present disclosure.

FIG. 3 depicts a configuration of the position detection system 2 including the computer 1 according to a second embodiment of the present disclosure. As can be understood by comparing FIG. 3 and FIG. 1, the computer 1 of the present embodiment is different from the computer 1 of the first embodiment in that the computer 1 of the first embodiment includes an MCU 41 in place of the MCU 40, and the computer 1 of the present embodiment is similar to the computer 1 of the first embodiment in other respects. Therefore, the difference from the computer 1 of the first embodiment will be mainly described.

The MCU 41 is the same as the MCU 40 of the first embodiment in that the MCU 41 executes the process of generating the temporary stroke image SI. The MCU 41 is different from the MCU 40 of the first embodiment in that the MCU 41 superimposes the generated temporary stroke image SI on the video signal VS2 output from the video board 13 instead of supplying the temporary stroke image SI to the scaler 20 and causing the scaler 20 to execute the process of superimposing the temporary stroke image SI on the video signal VS2. As described above, the output from the video board 13 is on a pixel-by-pixel basis. Therefore, the MCU 41 is configured to refer to the vertical synchronization signal (VSYNC) and the horizontal synchronization signal (HSYNC) to determine, for each pixel of the temporary stroke image SI, the timing of superimposition. The MCU 41 is configured to sequentially superimpose the pixels of the temporary stroke image SI on the video signal VS2 at the determined timing. A video signal VS3 that is the superimposed video signal VS2 is directly supplied from the MCU 41 to the display panel 14. The display panel 14 that has received the video signal VS3 executes a process of displaying the video on the panel surface 1a on the basis of the video signal VS3 instead of the video signal VS2.

As described above, the computer 1 of the present embodiment also generates, in parallel with the host processor 12, the temporary stroke image SI representing the same stroke as in the stroke image generated by the host processor 12 and superimposes the temporary stroke image SI on the video signal before the video signal is supplied to the timing controller 30. This can prevent a delay in displaying the stroke image caused by a processing delay in the computer 1 without providing the overlay engine in the timing controller 30.

According to the computer 1 of the present embodiment, the temporary stroke image SI can be generated and superimposed without renovating the existing video board 13 and the display panel 14. Therefore, the computer 1 can be more easily implemented than when the timing controller is renovated as in Patent Document 1.

Figure 4:
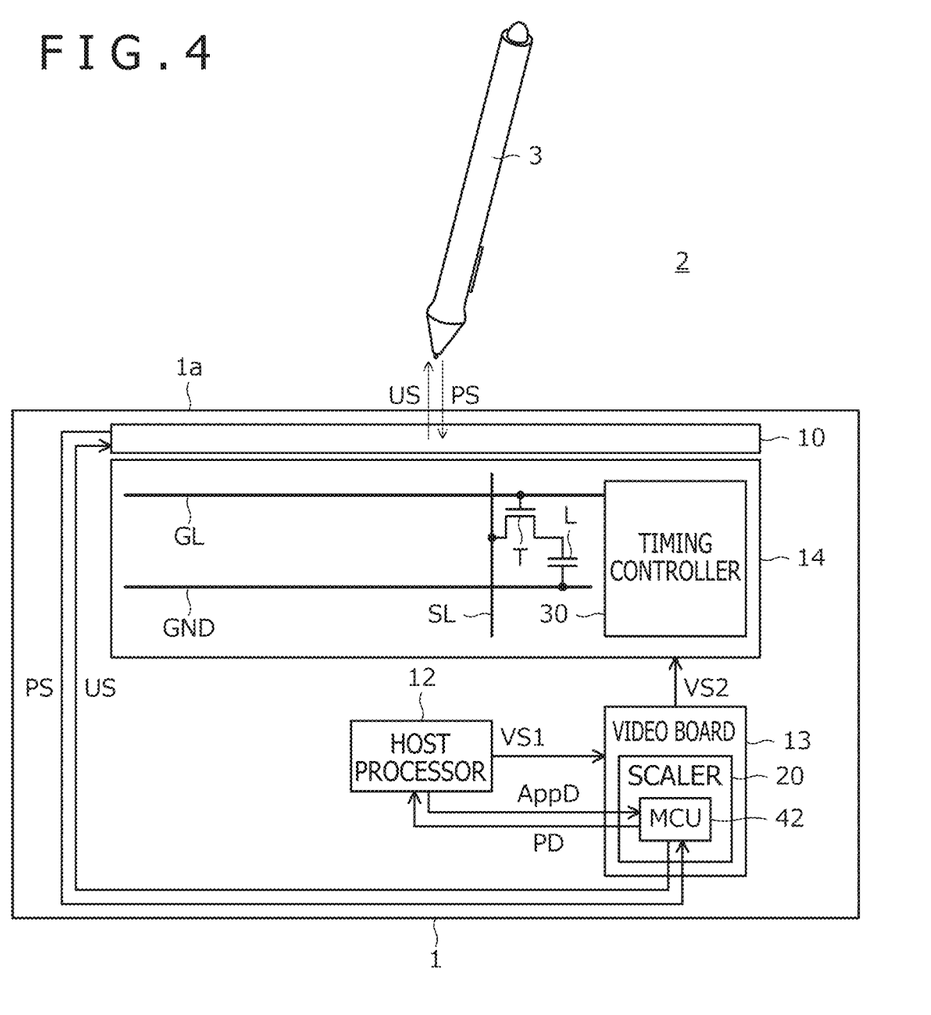
FIG. 4 depicts a configuration of the position detection system including the computer according to a third embodiment of the present disclosure.

FIG. 4 depicts a configuration of the position detection system 2 including the computer 1 according to a third embodiment of the present disclosure. As can be understood by comparing FIG. 4 and FIG. 1, the computer 1 of the present embodiment is different from the computer 1 of the first embodiment in that the computer 1 of the present embodiment does not include the sensor controller 11 and includes an MCU 42 in place of the MCU 40. The computer 1 of the third embodiment is similar to the computer 1 of the first embodiment in other respects. Therefore, the difference from the computer 1 of the first embodiment will be mainly described.

The MCU 42 is provided inside the scaler 20, and the MCU 42 plays a role of the sensor controller 11 of the first embodiment. Just like the MCU 40 of the first embodiment, the MCU 42 also plays a role of generating, in parallel with the host processor 12, the temporary stroke image SI representing the same stroke as in the stroke image generated by the host processor 12 and plays a role of superimposing the temporary stroke image SI on the video signal VS2 before the video signal VS2 is supplied to the timing controller 30.

In relation to the former role, the MCU 42 executes a process of transmitting the uplink signal US to the electronic pen 3 through the sensor 10 and receiving the pen signal PS transmitted by the electronic pen 3 as a reflection signal of the uplink signal US. The MCU 42 also executes a process of deriving or acquiring the pen data PD on the basis of the received pen signal PS and supplying the pen data PD to the host processor 12. The host processor 12 generates the stroke image on the basis of the pen data PD supplied in this way.

Figure 5:
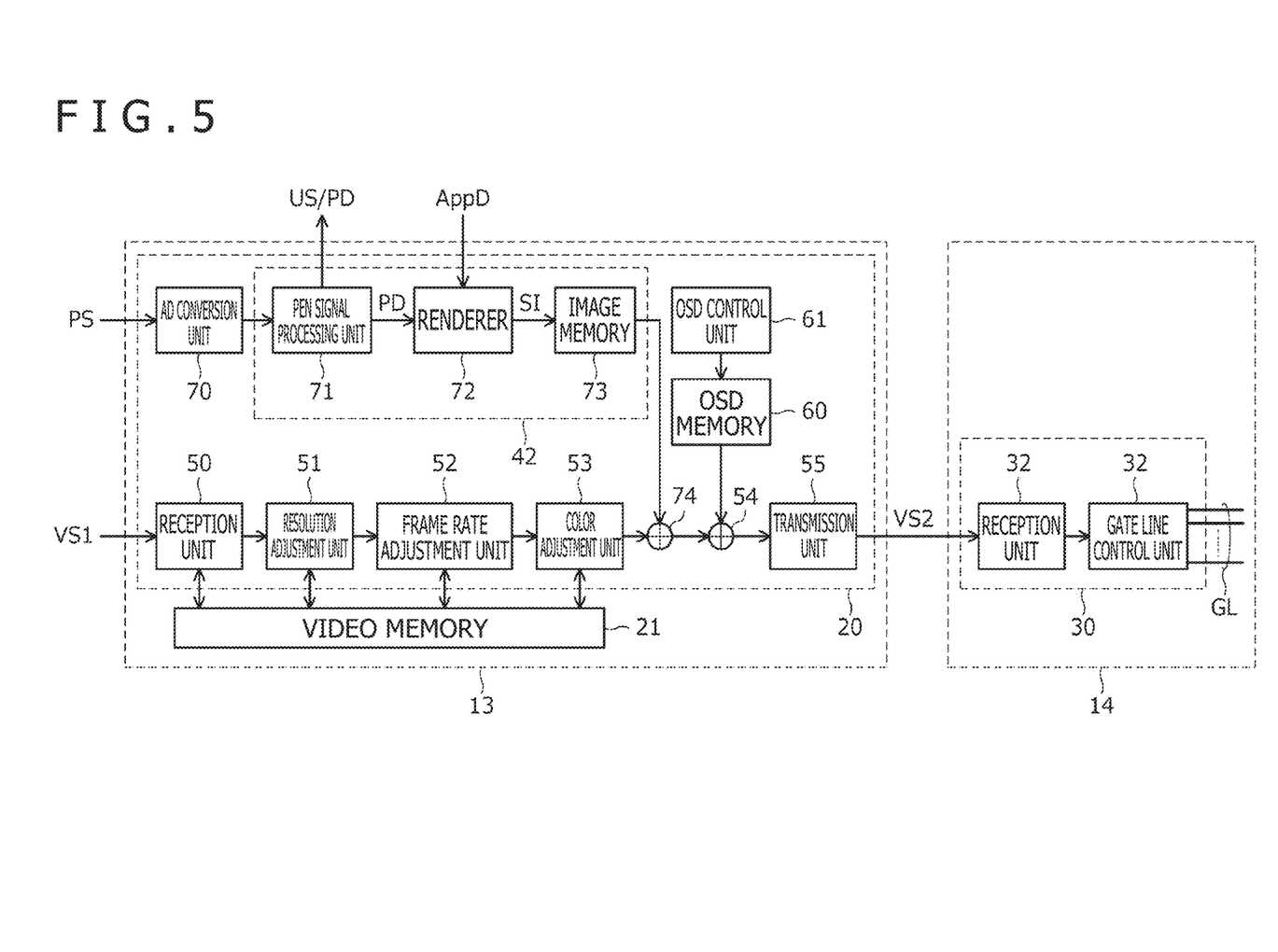
FIG. 5 depicts an internal configuration of the video board and the display panel according to the third embodiment of the present disclosure.

FIG. 5 depicts an internal configuration of the video board 13 and the display panel 14 according to the present embodiment. As can be understood by comparing FIG. 5 and FIG. 2, the video board 13 of the present embodiment is different from the video board 13 of the first embodiment in that the video board 13 of the present embodiment does not include the switching unit 62 and the memory control unit 63 and includes an AD (analog-to-digital) conversion unit 70, the MCU 42, and a mixer 74. The video board 13 of the present embodiment is similar to the video board 13 of the first embodiment in other respects. The configuration of the display panel 14 is the same as the configuration of the display panel 14 of the first embodiment.

The MCU 42 includes a pen signal processing unit 71, a renderer 72, and an image memory 73. The AD conversion unit 70 is positioned on a front stage of the pen signal processing unit 71. The AD conversion unit 70 plays a role of converting the pen signal PS received by each loop coil in the sensor 10 into a digital signal and supplying the digital signal to the pen signal processing unit 71.

Just like the sensor controller 11 of the first embodiment, the pen signal processing unit 71 executes a process of transmitting the uplink signal US to the electronic pen 3 and receiving the pen signal PS transmitted by the electronic pen 3 as a reflection signal of the uplink signal US. The pen signal processing unit 71 also executes a process of deriving or acquiring the pen data PD on the basis of the received pen signal PS and supplying the pen data PD to the host processor 12. The host processor 12 generates the stroke image on the basis of the pen data PD supplied in this way.

The pen signal processing unit 71 also supplies the derived or acquired pen data PD to the renderer 72. In addition to the pen data PD, the drawing data AppD is also supplied from the host processor 12 to the renderer 72. The renderer 72 generates the temporary stroke image SI on the basis of the pen data PD and the drawing data AppD supplied in this way and writes the generated temporary stroke image SI to the image memory 73. Just like the OSD memory 60, the image memory 73 is a storage unit that can store the image corresponding to at least one screen.

The mixer 74 is a circuit that superimposes the temporary stroke image SI stored in the image memory 73 on the video signal VS1 output from the color adjustment unit 53. After the process by the mixer 74, the temporary stroke image SI is displayed on the video (forefront of the video) expressed by the video signal VS1. The mixer 54 is provided on a backstage of the mixer 74. Therefore, when there is an OSD image to be displayed, the OSD image is displayed in front of the temporary stroke image SI.

As described above, the computer 1 of the present embodiment also generates, in parallel with the host processor 12, the temporary stroke image SI representing the same stroke as in the stroke image generated by the host processor 12 and superimposes the temporary stroke image SI on the video signal before the video signal is supplied to the timing controller 30. This can prevent a delay in displaying the stroke image caused by a processing delay in the computer 1 without providing the overlay engine in the timing controller 30.

The computer 1 of the present embodiment can also display the OSD image when the computer 1 displays the temporary stroke image SI. Moreover, the computer 1 can display the OSD image in front of the temporary stroke image SI.

Furthermore, the computer 1 of the present embodiment superimposes the temporary stroke image SI on the video signal VS1 in a backstage of the color adjustment unit 53. Therefore, the computer 1 can display the temporary stroke image SI that is a type of CG (computer graphics), without being affected by the color correction by the color adjustment unit 53, just like the OSD image.

Figure 6:
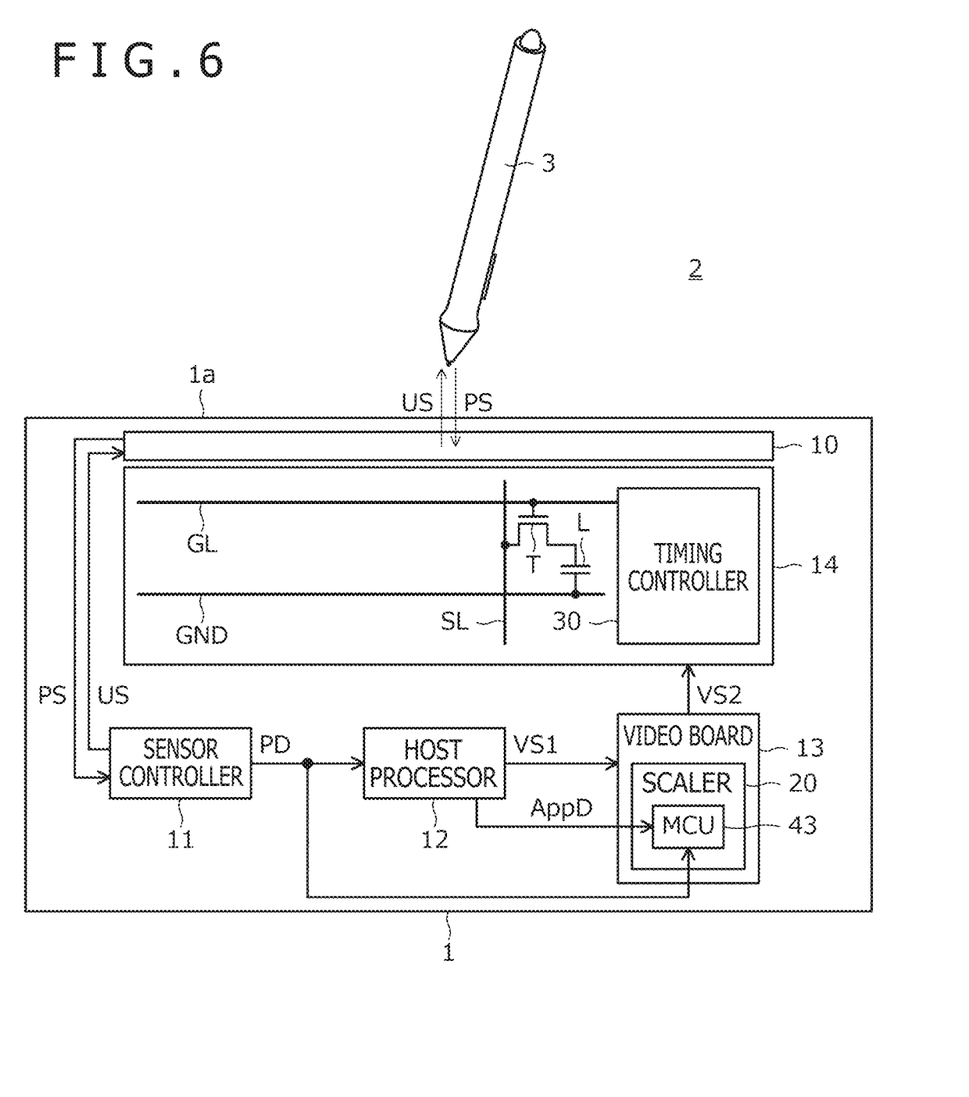
FIG. 6 depicts a configuration of the position detection system including the computer according to a fourth embodiment of the present disclosure.

FIG. 6 depicts a configuration of the position detection system 2 including the computer 1 according to a fourth embodiment of the present disclosure. As can be understood by comparing FIG. 6 and FIG. 4, the computer 1 of the present embodiment is different from the computer 1 of the first embodiment in that the computer 1 of the present embodiment includes an MCU 43 in place of the MCU 40. The computer 1 of the present embodiment is similar to the computer 1 of the first embodiment in other respects. Therefore, the difference from the computer 1 of the first embodiment will be mainly described.

Just like the MCU 42 described in the third embodiment, the MCU 43 is provided inside the scaler 20. The MCU 43 plays a role of generating, in parallel with the host processor 12, the temporary stroke image SI representing the same stroke as in the stroke image generated by the host processor 12 and superimposing the temporary stroke image SI on the video signal VS2 before the video signal VS2 is supplied to the timing controller 30. On the other hand, the MCU 43 does not play a role of the sensor controller 11, unlike the MCU 42 described in the third embodiment.

Figure 7:
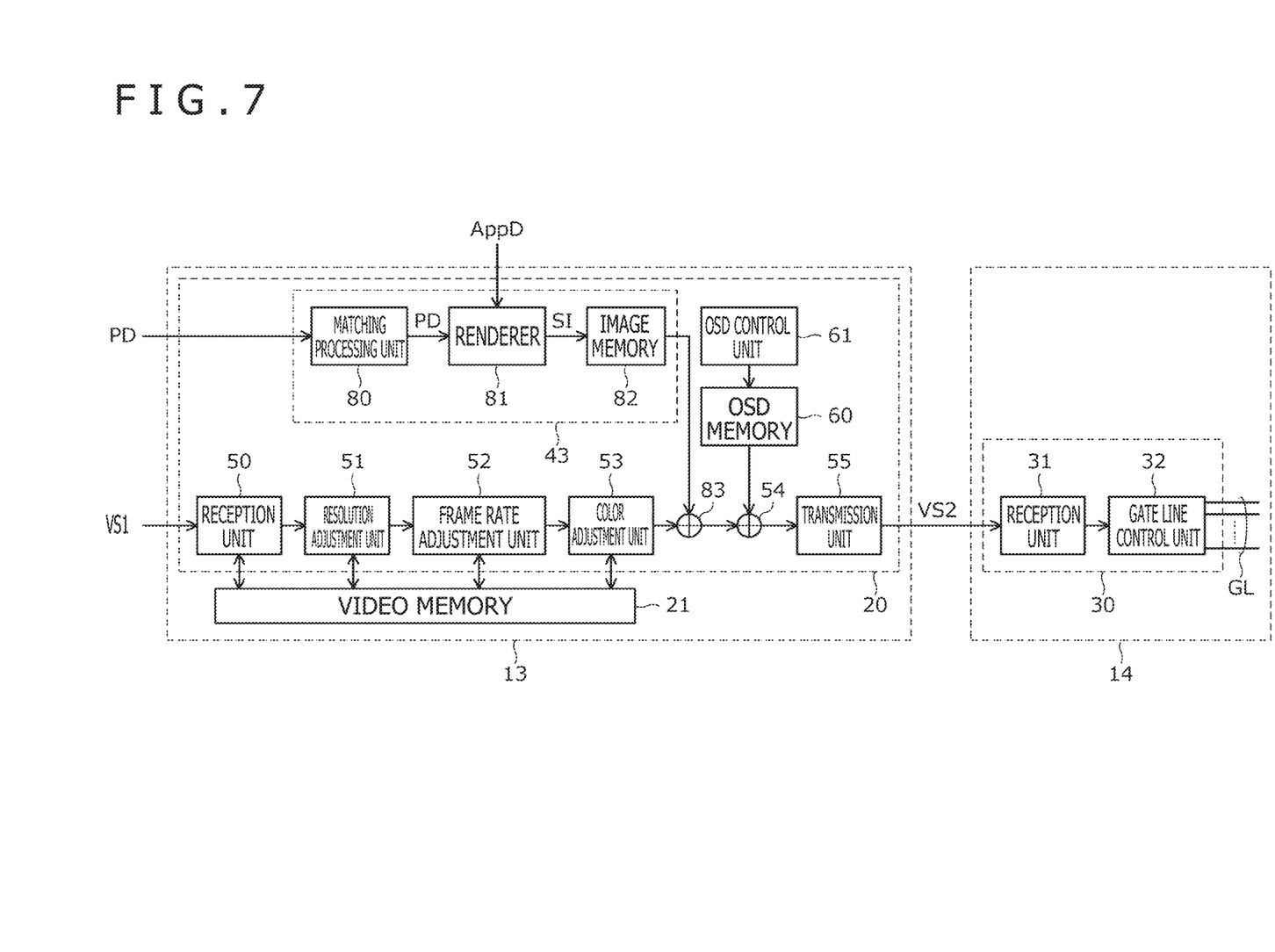
FIG. 7 depicts an internal configuration of the video board and the display panel according to the fourth embodiment of the present disclosure.

FIG. 7 depicts an internal configuration of the video board 13 and the display panel 14 according to the present embodiment. As can be understood by comparing FIG. 7 and FIG. 2, the video board 13 of the present embodiment is different from the video board 13 of the first embodiment in that the video board 13 of the present embodiment does not include the switching unit 62 and the memory control unit 63 and includes the MCU 43 and a mixer 83. The video board 13 of the present embodiment is similar to the video board 13 of the first embodiment in other respects. The configuration of the display panel 14 is the same as the configuration of the display panel 14 according to the first embodiment.

The MCU 43 includes a matching processing unit 80, a renderer 81, and an image memory 82. The pen data PD is sequentially supplied from the sensor controller 11 to the matching processing unit 80. The matching processing unit 80 is configured to convert the coordinate data included in the supplied pen data PD into coordinate data of the coordinate system of the display panel 14 and supply the pen data PD including the converted coordinate data to the renderer 81.

The functions and the operations of the renderer 81, the image memory 82, and the mixer 83 are similar to the functions and the operations of the renderer 72, the image memory 73, and the mixer 74 described in the third embodiment. Therefore, the temporary stroke image SI is also displayed in front of the video expressed by the video signal VS1 and on the back of the OSD image in the present embodiment.

As described above, the computer 1 of the present embodiment also generates, in parallel with the host processor 12, the temporary stroke image SI representing the same stroke as in the stroke image generated by the host processor 12 and superimposes the temporary stroke image SI on the video signal before the video signal is supplied to the timing controller 30. This can prevent a delay in displaying the stroke image caused by a processing delay in the computer 1 without providing the overlay engine in the timing controller 30.

As in the third embodiment, the computer 1 of the present embodiment can also display the OSD image when the computer 1 displays the temporary stroke image SI. Moreover, the computer 1 of the present embodiment can display the OSD image in front of the temporary stroke image SI.

Furthermore, the computer 1 of the present embodiment also superimposes the temporary stroke image SI on the video signal VS1 in the back stage of the color adjustment unit 53 as in the third embodiment. Therefore, the computer 1 can display the temporary stroke image SI that is a type of CG, without being affected by the color correction by the color adjustment unit 53, just like the OSD image.

Although the preferred embodiments of the present disclosure have been described, the present disclosure is not limited to the embodiments in any way, and it is obvious that the present disclosure can be carried out in various modes without departing from the scope of the present disclosure.

For example, although the process from the generation to the display of the stroke image is completed inside the computer 1 in the examples described in the embodiments, the present disclosure can also be applied when an online meeting application or the like is used to remotely connect the computer 1 to another computer, in which the stroke image generated by the host processor 12 is transmitted to the other computer, and the stroke image is included in an image transmitted from the other computer to the computer 1. That is, there is a large delay before the stroke image generated by the computer 1 is displayed in the image transmitted from the other computer to the computer 1, compared to when the process from the generation to the display of the stroke image is completed inside the computer 1. However, the process of the present disclosure can be executed to display the temporary stroke image in the image transmitted from the other computer to the computer 1, thereby preventing a delay in displaying the stroke image even in such a case.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer comprising:
a host processor which, in operation, generates a stroke image representing a stroke indicated by a series of coordinate data indicating a plurality of positions of a pen on a touch surface and outputs a video signal representing the stroke image;
a timing controller which, in operation, controls, based on the video signal, a potential of each of a plurality of gate lines provided in a display;
a temporary stroke image generation processor which in operation, generates, in parallel with the host processor, a temporary stroke image representing a same stroke as the stroke represented by the stroke image,
wherein the temporary stroke image is superimposed on the video signal before the video signal is supplied to the timing controller; and
a scaler which, in operation, converts the video signal output from the host processor into a converted video signal corresponding to the display and supplies the converted video signal to the timing controller,
wherein the scaler includes:
an on-screen display memory which, in operation, stores an on-screen display image to be superimposed on the video signal, and
a mixer which, in operation, superimposes the on-screen display image stored in the on-screen display memory on the video signal,
wherein the temporary stroke image generation processor, in operation, writes the temporary stroke image to the on-screen display memory,
wherein the scaler, in operation, outputs the converted video signal to the temporary stroke image generation processor, and
wherein the temporary stroke image generation processor, in operation, superimposes the temporary stroke image on the converted video signal output from the scaler and supplies the converted video signal with the temporary stroke image superimposed thereon to the timing controller.

2. The computer according to claim 1, wherein the on-screen display image stored by the on-screen display memory is a screen that is displayed by the display during adjustment of a color and a position of the screen.

3. The computer according to claim 2, wherein the on-screen display image stored by the on-screen display memory is a screen that is displayed by the display in response to a user operation of the display.

4. The computer according to claim 1, further comprising:
a sensor controller which, in operation, derives the series of coordinate data based on a pen signal received from the pen and outputs the series of coordinate data to each of the host processor and the temporary stroke image generation processor,
wherein the temporary stroke image generation processor, in operation, generates the temporary stroke image based on the series of coordinate data supplied from the sensor controller.

5. A method comprising:
generating, by a host processor, a stroke image representing a stroke indicated by a series of coordinate data indicating a plurality of positions of a pen on a touch surface;
outputting, by the host processor, a video signal representing the stroke image;
controlling, by a timing controller, based on the video signal, a potential of each of a plurality of gate lines provided in a display;
generating, by a temporary stroke image generation processor, in parallel with the host processor, a temporary stroke image representing a same stroke as the stroke represented by the stroke image,
wherein the temporary stroke image is superimposed on the video signal before the video signal is supplied to the timing controller;
converting, by a scaler, the video signal output from the host processor into a converted video signal corresponding to the display;
supplying, by the scaler, the converted video signal to the timing controller;
storing, by an on-screen display memory of the scaler, an on-screen display image to be superimposed on the video signal;
superimposing, by a mixer of the scaler, the on-screen display image stored in the on-screen display memory on the video signal;
writing, by the temporary stroke image generation processor, the temporary stroke image to the on-screen display memory;
outputting, by the scaler, the converted video signal to the temporary stroke image generation processor;
superimposing, by the temporary stroke image generation processor, the temporary stroke image on the converted video signal output from the scaler; and
supplying, by the temporary stroke image generation processor, the converted video signal with the temporary stroke image superimposed thereon to the timing controller.

6. The method according to claim 5, wherein the on-screen display image stored by the on-screen display memory is a screen that is displayed by the display during adjustment of a color and a position of the screen.

7. The method according to claim 6, wherein displaying, by the display, the on-screen display image in response to a user operation of the display.

8. The method according to claim 5, further comprising:
deriving, by a sensor controller, the series of coordinate data based on a pen signal received from the pen;
outputting, by the sensor controller, the series of coordinate data to each of the host processor and the temporary stroke image generation processor; and
wherein the generating by the temporary stroke image generation processor includes generating the temporary stroke image based on the series of coordinate data supplied from the sensor controller.

* * * * *